United States Patent
Ge et al.

(10) Patent No.: US 9,892,213 B2
(45) Date of Patent: Feb. 13, 2018

(54) ASYMMETRIC CABLE-MEMBRANE TENSEGRITY STRUCTURE OF OPENING TYPE, METHOD OF CONSTRUCTING THE SAME AND METHOD OF DESIGNING THE SAME

(71) Applicant: China Aviation Planning and Construction Development Co., Ltd., Beijing (CN)

(72) Inventors: Jiaqi Ge, Beijing (CN); Guojun Zhang, Beijing (CN); Shu Wang, Beijing (CN); Mansheng Zhang, Beijing (CN); Zhizhong Guan, Beijing (CN); Ling Zhang, Beijing (CN); Botao Ma, Beijing (CN)

(73) Assignee: CHINA AVIATION PLANNING & CONSTRUCTION DEVELOPMENT, Beijing (CN)

( * ) Notice: Subject to any disclaimer, the term of this patent is extended or adjusted under 35 U.S.C. 154(b) by 435 days.

(21) Appl. No.: 14/409,395

(22) PCT Filed: Jun. 18, 2013

(86) PCT No.: PCT/CN2013/077380
§ 371 (c)(1),
(2) Date: Dec. 18, 2014

(87) PCT Pub. No.: WO2013/189275
PCT Pub. Date: Dec. 27, 2013

(65) Prior Publication Data
US 2015/0178411 A1    Jun. 25, 2015

(30) Foreign Application Priority Data

Jun. 18, 2012 (CN) .......................... 2012 1 0200718
Jun. 18, 2012 (CN) .......................... 2012 1 0200722
Jun. 18, 2012 (CN) .......................... 2012 1 0200723

(51) Int. Cl.
G06F 17/50    (2006.01)
E04B 7/14    (2006.01)
G06F 17/10    (2006.01)

(52) U.S. Cl.
CPC ................ G06F 17/50 (2013.01); E04B 7/14 (2013.01); G06F 17/10 (2013.01); G06F 17/5086 (2013.01); G06F 2217/36 (2013.01)

(58) Field of Classification Search
CPC ...... G06F 17/50; G06F 17/10; G06F 17/5056; G06F 2217/36
(Continued)

(56) References Cited

U.S. PATENT DOCUMENTS 5,899,028 A      5/1999   Warner
8,074,404 B2 *  12/2011   Zhang ...................... E04B 7/14
                                                           52/223.13
2009/0044459 A1 *  2/2009  Kolozsvary-Kiss ...... E04B 7/14
                                                           52/63

FOREIGN PATENT DOCUMENTS

CN    201411778 Y    2/2009
CN    201377123 Y    1/2010
(Continued)

OTHER PUBLICATIONS

Li, Zhongli et al, Wuhu Stadium Membrane Structure Canopy, The collections of the 2nd National Modern Structural Engineering Seminar, Jul. 2002, pp. 147-152, ISSN 1000-8993.
(Continued)

*Primary Examiner* — Eunhee Kim
(74) *Attorney, Agent, or Firm* — Haynes and Boone, LLP

(57) ABSTRACT

A cable-membrane tensegrity structure which is asymmetric, and construction method and design method thereof are
(Continued)

provided. The cable-membrane tensegrity structure comprises a central opening and is formed by a ring cable (4) and three layers of radial cables comprising a suspension cable (1), a ridge cable (2) and a valley cable (3), wherein the suspension cable (1) is located above the ridge cable (2), the ridge cable (2) is located above the valley cable (3), wherein one end of each of the suspension cable (1), the ridge cable (2) and the valley cable (3) is connected to the ring cable (4), and the other end of each of the suspension cable (1), the ridge cable (2) and the valley cable (3) is connected to a peripheral supporting structure (7), wherein a coating membrane (5) is tensioned between the ridge cable (2) and the valley cable (3) that are adjacent to each other and function as a skeleton to tension the coating membrane (5). The method of constructing the cable-membrane tensegrity structure comprises steps of: lifting step by step the suspension cable (1), the ridge cable (2) and the valley cable (3) to positions adjacent to respective cable anchor nodes by a traction device, based on a shape of formed cable-membrane tensegrity structure; and tensioning and anchoring synchronously the suspension cable (1), the ridge cable (2) and the valley cable (3) in place by a tensioning device, so as to achieve a final shape of the cable-membrane tensegrity structure. A multi-stage design method, based on the bearing whole-process, of a cable-membrane tensegrity structure of an opening type is also provided.

14 Claims, 9 Drawing Sheets

(58) Field of Classification Search
USPC .......................................................... 703/1, 2
See application file for complete search history.

(56) References Cited

FOREIGN PATENT DOCUMENTS

| CN | 102733479 A | 10/2012 |
| CN | 102733481 A | 10/2012 |
| CN | 102733525 A | 10/2012 |
| WO | 9410411 A1 | 11/1994 |

OTHER PUBLICATIONS

Duan, Youheng, Cable-Membrane Structure Stretching and Loading Whole Course Simulating Computation, Oct. 2012, 2012 No. 10, the whole document, ISSN1674-0246.

* cited by examiner

ASYMMETRIC CABLE-MEMBRANE TENSEGRITY STRUCTURE OF OPENING TYPE, METHOD OF CONSTRUCTING THE SAME AND METHOD OF DESIGNING THE SAME

CROSS-REFERENCE TO RELATED APPLICATIONS

This application is a National Stage application of, and claims priority to, International Application No. PCT/CN2013/077380, filed Jun. 18, 2013, which claims priority under 35 U.S.C. § 119(b) to Chinese Patent Applications 201210200718.6, 201210200722.2 and 201210200723.7, filed Jun. 18, 2012, the contents of which are incorporated herein by reference in their entireties.

BACKGROUND OF THE INVENTION

Field of the Invention

The present invention relates to the technical field of long span structure, particularly, relates to a long span cable-membrane structure, more particularly, relates to a cable-membrane tensegrity structure which is asymmetric and is of an opening type, a method of constructing the same, and a method of designing the same.

Description of the Related Art

Cable-membrane structure, as a novel tension structure, is developed from the late twentieth century. The cable-membrane structure has unique characteristics of structure system, and can make full use of the tensile characteristics of the cable material and the membrane material, increasing the utilization efficiency of materials. The history of the cable-membrane structure may be traced back to ancient tent. However, the ancient tent, as a temporary construction, was not paid much attention to by people before the 80's of last century. After a novel membrane material was developed in the 80's of last century, and the membrane structure is widely applied. According to the construction formation, the membrane structure can be classified as: inflatable membrane structure; cable truss membrane structure; cable dome structure and tension cable-membrane structure.

The tension cable-membrane structure is a structure system depended on tension of membrane and composed of tension cable and the membrane. The tension cable-membrane structure is mainly composed of the tension cable and the membrane material covering on the tension cable. The tension cable can be divided into a valley cable, a ridge cable and a side cable which is at the edge of the membrane. In this kind of structure, the membrane unit is fully tensioned, and can withstand a certain load. This kind structure of membrane unit can serve as a horizontal connection of the structure, has a good bearing capacity, and has a good absorbing effect on the earthquake and the wind load in the horizontal direction.

According to the stress characteristics, the tension cable-membrane structure can be classified as:

(1) A general tension cable-membrane structure, the membrane of which is the main stress part. In this structure, the membrane has certain rigidity by applying a pre-stress to the membrane. Due to limit strength of the membrane itself, a great pre-stress cannot be exerted on the membrane. Thereby, this kind of structure is generally used in small span structure.

(2) A composite tension cable-membrane structure, the cable of which bears the main stress of the structure, and the membrane of which is mainly subjected to local load. Because of the existence of the cable net, this kind of structure has rigidity larger than that of the general tension cable-membrane structure, and it can be used in a large span structure. In addition, in this kind of structure, the pre-stress must be proportionally applied on the cable and the membrane.

The existing cable-membrane tensegrity structure of an opening type is mainly used for the stadium building and mainly comprises two types of (1) The radial cables comprise a lower layer and an upper layer at the outer ring cable and intersect to form one layer at the inner ring cable. The plane is circular or substantially elliptical and has a relatively regular overall configuration. The inner ring cables are in the same plane. (2) The two layers of radial cables intersect to form a circle in the periphery and are divided into two layers at the inner ring cable. The two layers of radial cables are connected by using support bars. As for the above cable-membrane tensegrity structure of an opening type, because of structural constraints, they mostly have a symmetrical shape, and it is difficult to realize an asymmetric shape of the building effect.

Since the tension cable-membrane structure has a beautiful appearance, a lithe and light body, a high material utilization rate, the tension cable-membrane structure is especially suitable for stadium, exhibition venue, airport and other large span structure's roof. With the development of computer technology, the tension cable-membrane structure is developed widely in practical engineering, the cable net in the tension cable-membrane structure functions as the main stress part, and the tension cable-membrane structure is formed by tensioning the membrane as a secondary stress part. Because of the existence of the cable net, this kind of structure has rigidity larger than that of the general cable-membrane structure, and it can be used in the large span structure. In addition, in this kind of structure, the pre-stress must be proportionally applied on the cable and the membrane. The cable-membrane structure of large span is very complex in construction. Thereby, a reasonable construction scheme can not only make the structure formation to meet the design requirements, and can reduce the difficulty of construction process. Different tension construction methods may exert different influences on the stress state of the structure after forming, therefore, the reasonable tension construction scheme relates to the limit stress and the safety performance of the structure.

In the pre-stress cable-membrane tensegrity structure of an opening type, the steel cable is the main force bearing part, and it has a suitable stress characteristics and a high structure efficiency, and can reflect the modern advanced materials, structural system of contemporary architecture design and construction technical level. A whole tension main structure of an opening type consists of two portions (see FIG. 1 and FIG. 4): a continuous tension cable net the dimensional cable-membrane tensegrity structure comprising a central opening and being formed by a suspension cable 1, a ridge cable 2, a valley cable 3 and a ring cable 4; and a surrounding supporting structure 7. Cable membrane secondary structure comprises a membrane side cable 12 and a membrane tensioned on the ridge cable and the valley cable. Pre-stress is applied to the cable net of an opening type so as to convert it from the mechanism to the structure that can withstand the use load. Thereby, the tension cable net is the main stress part of the pre-stress cable-membrane tensegrity structure of an opening type, and it implements the "advanced structural mechanics theory of continuous tension ocean". This structure system belongs to a nonlinear flexible structure with main characteristics of "small strain-large vertical deformation".

The pre-stress cable-membrane tensegrity structure of an opening type is very novel, and is restricted by design theory and design means. So far, the design of the pre-stress tensegrity structure is limited to only the elastic stage design, mainly including the member elastic bearing capacity design and the system elastic vertical deformation capacity design. The above design method cannot reflect the whole-process of structural mechanics characteristics from loading to failure, cannot fully reveal security control elements in various stress stages of the structure, and cannot fully meet the pre-stress tensegrity structure safety design requirements. The above design method has been far behind compared with the "elastic-nonlinear" two-stage design method adopted in the conventional construction engineering. Moreover, this kind of structure system belongs to a flexible cable net structure with the main characteristics of the nonlinear large vertical deformation, and the structure response under load is completely different from the mainly rigid structure in conventional construction engineering. Thereby, the current elastic design method cannot reflect the nonlinear large vertical deformation characteristics of pre-stress tensegrity structure of an opening type, cannot achieve the safety control on the bearing capacity and the vertical deformation capacity of the flexible structure, and cannot satisfy the characteristics requirements of the flexible structure system having the characteristics of nonlinear large vertical deformation. Based on the above reasons, the current design method cannot fully meet the safety, the economy and the rationality requirements of pre-stress tensegrity structure of an opening type.

SUMMARY OF THE INVENTION

The present invention has been made to overcome or alleviate at least one aspect of the above mentioned disadvantages.

The present invention provides a novel cable-membrane tensegrity structure, comprising a central opening and being formed by three layers of radial tension cables and a ring cable, the three layers of radial tension cables comprising a layer of suspension cable, a layer of ridge cable and a layer of valley cable. In this way, a cable membrane vertical bearing stiffness can be formed by a tensioned membrane surface between the ridge cable and the valley cable and by means of height difference between outer ends of the ridge cable and the valley cable. The suspension cable enhances overall vertical stiffness of the structure. Because there are three layers of cables, it can realize the asymmetric shape of the building effect by adjusting the tension force of the suspension cable and the ridge cable at different locations.

According to an aspect of the present invention, there is provided a cable-membrane tensegrity structure which is asymmetric, comprising a central opening and being formed by three layers of radial tension cables and a ring cable, the three layers of radial tension cables comprising a layer of suspension cable, a layer of ridge cable and a layer of valley cable, wherein the suspension cable is located above the ridge cable, the ridge cable is located above the valley cable, wherein one end of each of the suspension, ridge and valley cables is connected to the ring cable, and the other end of each of the suspension, ridge and valley cables is connected to a peripheral supporting structure, wherein a coating membrane is tensioned between the ridge cable and the valley cable that are adjacent to each other and function as a skeleton to tension the coating membrane.

Further, the cable-membrane tensegrity structure further comprises a membrane side cable tensioned between the other ends of the ridge cable and the valley cable that are adjacent to each other, wherein the membrane side cable tensions an edge of the coating membrane between the other ends of the ridge cable and the valley cable that are adjacent to each other.

Alternatively, the peripheral supporting structure comprises a suspension cable anchor node at the top, a ridge cable anchor node in the middle and a valley cable anchor node at the bottom, the other end of the suspension cable is connected to the suspension cable anchor node, the other end of the ridge cable is connected to the ridge cable anchor node, and the other end of the valley cable is connected to the valley cable anchor node, the ring cable is connected to the one ends of the valley cable and the suspension cable via a first ring-cable-clamp anchor node, the ring cable is connected to the one end of the ridge cable via a second ring-cable-clamp anchor node.

Alternatively, the peripheral supporting structure includes a post, a top ring beam or truss, a middle ring beam or truss and a bottom ring beam or truss, the suspension cable anchor node is disposed on the top ring beam or truss, the ridge cable anchor node is disposed on the middle ring beam or truss, and the valley cable anchor node is disposed on the bottom ring beam or truss.

Alternatively, the peripheral supporting structure is configured to be a X-typed post.

Alternatively, the valley cable, the ridge cable and the suspension cable each is configured that a cable tension force thereof is adjustable.

Alternatively, the ring cable comprises a single ring cable or a set of parallel ring cables.

Alternatively, the suspension cables are arranged in a radial radiation form or an X-typed intersection form.

By means of the above technical solution, it can realize a stadium roof with an asymmetric saddle shaped building shape, and the height difference between outer ends of the ridge cable and the valley cable may be not too high. The suspension cable is located above the membrane surface, and it has little effect on construction effect. Thereby, the stadium roof has a more beautiful membrane surface building effect, a reasonable structure stress, and can be quickly constructed.

The present invention provides a method of constructing a cable-membrane tensegrity structure which is asymmetric. The cable-membrane tensegrity structure comprises a central opening and is formed by three layers of radial tension cables and a ring cable, the three layers of radial tension cables comprising a layer of suspension cable, a layer of ridge cable and a layer of valley cable. A cable membrane vertical bearing stiffness can be formed by a tensioned membrane surface between the ridge cable and the valley cable and by means of height difference between outer ends of the ridge cable and the valley cable. The suspension cable enhances overall vertical stiffness of the structure. The construction method of the present invention does not need to set the scaffolding; it needs only a peripheral steel structure as the support structure. Furthermore, the cables are lifted in batches and tensioned synchronously. In this way, it can realize the designed shape, the construction whole-process structure state can be controlled, the construction safety state can be controlled, and the construction method is simple and efficient.

According to another aspect of the present invention, there is provided a method of constructing a cable-membrane tensegrity structure which is asymmetric, the cable-membrane tensegrity structure comprising a central opening and being formed by three layers of radial tension cables and a ring cable, the three layers of radial tension cables comprising a layer of suspension cable, a layer of ridge cable and a layer of valley cable, wherein the suspension cable is located above the ridge cable, the ridge cable is located above the valley cable, one end of each of the suspension, ridge and valley cables is connected to the ring cable, and the other end of each of the suspension, ridge and valley cables is connected to a peripheral supporting structure, a coating membrane is tensioned between the ridge cable and the valley cable that are adjacent to each other and function as a skeleton to tension the coating membrane, wherein the method comprises steps of: lifting step by step the suspension cable, the ridge cable and the valley cable to positions adjacent to respective cable anchor nodes by a traction device, based on a shape of formed cable-membrane tensegrity structure; and tensioning and anchoring synchronously the suspension cable, the ridge cable and the valley cable in place by a tensioning device, so as to achieve a final shape of the cable-membrane tensegrity structure.

Advantageously, a whole-process computer simulation analysis of tensioning pre-stressed tension cable is used as a construction guidance.

Advantageously, the whole-process computer simulation analysis of tensioning pre-stressed tension cable considers structural system geometrical nonlinear, adopts a large universal finite element program and uses a Newton-Raphson nonlinear iteration strategy to solve equations.

Advantageously, the suspension cable, the ridge cable, the valley cable, the coating membrane are tensioned in this order, and the ring cable is not tensioned, so as to form the final cable-membrane tensegrity structure.

Advantageously, after each tensioning step is completed, detecting a tension cable stress $6_s$ of the tension cable, and determining whether the tension cable stress $6_s$ satisfies a tension-cable-stress determination condition for allowing construction:

$$0.956_0 \le 6_s \le 1.056_0, \text{ in which}$$

60 is a tension stress of tension cable determined by the whole-process computer simulation analysis, after all tension cables are tensioned, detecting a maximum deformation value $d_S$ of the ring cable, and determining whether the maximum deformation value $d_S$ satisfies a ring-cable-deformation determination condition for allowing construction:

$$0.90\, d_0 \le d_S \le 1.10\, d_0, \text{ in which}$$

$d_0$ is a maximum deformation value determined by the whole-process computer simulation analysis, after all tension cables are tensioned, detecting a tension stress $6_{HS}$ of the ring cable, and determining whether the tension stress $6_{HS}$ satisfies an ring-cable-stress determination condition for allowing construction:

$$0.90\, 6_{H0} \le 6_{HS} \le 1.10\, 6_{H0}, \text{ in which}$$

$6_{H0}$ is a tension stress of the ring cable determined by the whole-process computer simulation analysis.

More specifically, the above method further comprises steps of:

(1) performing the whole-process computer simulation analysis of tensioning pre-stressed tension cable, by taking a structure formation meeting design requirement as a target, taking whole tension of cable-membrane structure as a basic principle for tension construction, building up a whole structure calculation model by a computer, and inputting related structure parameters; using technical parameters, such as, the pre-stress of the tension cables, a cutting length of the cables and a sequence to tension the tension cables, for the tension construction, wherein the whole-process computer simulation analysis of tensioning pre-stressed tension cable considers structural system geometrical nonlinear, adopts a large universal finite element program and uses a Newton-Raphson nonlinear iteration strategy to solve equations;

(2) mounting a peripheral steel structure from bottom to top, and mounting a ring beam or truss-valley cable anchor node, a ring beam or truss-ridge cable anchor node, and a ring beam or truss-suspension cable anchor node;

(3) obtaining cutting lengths of the respective cables based on a result of the construction simulation analysis, and cutting the ring cable and the radial cables based on the obtained cutting lengths;

(4) assembling the ring cable on the ground, connecting the ring cable to one ends of the suspension cable and the valley cable via a first ring-cable-clamp anchor node, and connecting the ring cable to one end of the ridge cable via a second ring-cable-clamp anchor node;

(5) pulling the other end of the suspension cable to a position distanced from a corresponding ring beam or truss-suspension cable anchor node at the top of the peripheral steel structure, by a predetermined distance within 0.4 m to 1.5 m by means of an auxiliary cable, so as to lift the ring cable together with the ridge cable and the valley cable off the ground;

(6) replacing a traction assembly with a tension assembly, and synchronously tensioning the other end of the suspension cable based on the result of the construction stimulation analysis, detecting the tension stress $6_{DS}$ of the tensioned suspension cable, and determining whether the tension stress $6_{DS}$ satisfies a suspension-cable-tension-stress determination condition for allowing construction:

$$0.956_{D0} \le 6_{DS} \le 1.056_{D0}, \text{ in which}$$

$6_{D0}$ is a pre-tension stress of suspension cable determined by the whole-process computer simulation analysis, if not, it needs to adjust the tension stress of the suspension cable by loosening or tightening the tensioned suspension cable until the determination condition is satisfied, after the other end of the suspension cable is tensioned in place, the other end of the suspension cable is connected to the ring beam or truss-suspension cable anchor node at the top;

(7) pulling the other end of the ridge cable to a position adjacent to corresponding ring beam or truss-ridge cable anchor node by means of the auxiliary cable, then synchronously tensioning the other end of the ridge cable based on the result of the construction stimulation analysis, detecting the tension stress $6_{JS}$ of the tensioned ridge cable, and determining whether the tension stress $6_{JS}$ satisfies a ridge-cable-tension-stress determination condition for allowing construction:

$$0.956_{J0} \le 6_{JS} \le 1.056_{J0}, \text{ in which}$$

$6_{J0}$ is a pre-tension stress of ridge cable determined by the whole-process computer simulation analysis, if not, it needs to adjust the tension stress of the ridge cable by loosening or tightening the tensioned ridge cable until the determination condition is satisfied, after the other end of the ridge cable is tensioned in place, the other end of the ridge cable is connected to the ring beam or truss-ridge cable anchor node;

(8) pulling the other end of the valley cable to a position adjacent to the respective ring beam or truss-valley cable anchor node by means of the auxiliary cable, then synchronously tensioning the other end of the valley cable based on the result of the construction stimulation analysis, detecting the tension stress $6_{GS}$ of the tensioned valley cable, and determining whether the tension stress $6_{GS}$ satisfies a valley-cable-tension-stress determination condition for allowing construction:

$$0.956_{G0} \leq 6_{GS} \leq 1.056_{G0}, \text{ in which}$$

$6_{G0}$ is a pre-tension stress of valley cable determined by the whole-process computer simulation analysis, if not, it needs to adjust the tension stress of the valley cable by loosening or tightening the tensioned valley cable until the determination condition is satisfied, after the other end of the valley cable is tensioned in place, the other end of the valley cable is connected to the ring beam or truss-valley cable anchor node;

(9) detecting the maximum deformation value $d_S$ of the ring cable, and determining whether the maximum deformation value $d_S$ satisfies a ring-cable-deformation determination condition for allowing construction: $0.90\ d_0 \leq d_S \leq 1.10\ d_0$;

detecting the tension stress $6_{HS}$ of the ring cable, and determining whether the tension stress $6_{HS}$ satisfies a ring-cable-tension-stress determination condition for allowing construction:

$$0.90\ 6_{H0} \leq 6_{HS} \leq 1.10\ 6_{H0}, \text{ in which}$$

$6_{H0}$ is a pre-tension stress of ring cable determined by the whole-process computer simulation analysis, if not, it needs to readjust the tension stress of the suspension cable, the ridge cable and the valley cable until the ring-cable-tension-stress and ring-cable-deformation determination conditions for allowing construction, as well as the suspension-cable-tension-stress, ridge-cable-tension-stress and valley-cable-tension-stress determination conditions for allowing construction are satisfied,

(10) tensioning the coating membrane between the ridge cable, the valley cable and the membrane side cable to form the cable-membrane tensegrity structure based on the result of the whole-process computer simulation analysis.

Alternatively, the steps (4) and (5) are replaced by steps of: (1') assembling the ring cable on the ground, connecting the ring cable to one end of the suspension cable via a first ring-cable-clamp anchor node, and connecting the first ring-cable-clamp anchor node and a second ring-cable-clamp anchor node to the ring cable at the same time;

(2') pulling the other end of the suspension cable (1) to a position distanced from a corresponding ring beam or truss-suspension cable anchor node at the top of the peripheral steel structure, by a predetermined distance within 0.4 m to 1.5 m by means of an auxiliary cable, so as to lift the ring cable off the ground;

(3') connecting the first ring-cable-clamp anchor node to one end of the valley cable, and connecting the second ring-cable-clamp anchor node to one end of the ridge cable.

In the present invention, a cable membrane whole tension construction method, in which the cables are lifted step by step, is adopted, and a whole-process computer simulation analysis of tensioning pre-stressed tension cable is used as the construction guidance. Thus, the actual tension construction formation meets the design structure formation requirements, and an opening-type stadium roof, which is of a cable-membrane tensegrity structure having an asymmetric saddle shape, is achieved efficiently and simply. In addition, during the whole-process of construction, the structure stress state and construction safety state may be controlled, and the construction method is simple and efficient.

In order to improve and perfect the engineering design of the pre-stress cable-membrane tensegrity structure of an opening type, the inventor of the present invention, based on a lot of experiments and calculation analysis on the opening-type whole tension flexible structure with obvious nonlinear vertical deformation characteristics, provides a multi-stage design method which is based on a bearing whole-process and which is suitable for a pre-stress tensegrity structure of an opening type.

An object of the present invention is to provide a multi-stage-target-control design method, based on a bearing whole-process, of a pre-stress tensegrity structure of an opening type, and a method of determining design parameters in various stages, so as to fully reflect flexible structure characteristics of "small strain-large vertical deformation" of the bearing whole-process of the pre-stress cable-membrane tensegrity structure of an opening type, to solve the technical problem in the existing method of designing a pre-stress tensegrity structure of an opening type, and to achieve the safety, the economy and the rationality of the design of the pre-stress cable-membrane tensegrity structure of an opening type. The term "bearing whole-process" refers to a whole-process from a state where the structure is only subjected to the self weight and the initial pre-tension stress of tension cable to a state where a load applied on the structure is gradually increased to the structure damage limit.

According to still another aspect of the present invention, there is provided a multi-stage design method, based on a bearing whole-process, of a pre-stress cable-membrane tensegrity structure, the cable-membrane tensegrity structure comprising a central opening and being formed by three layers of radial tension cables and a ring cable, the three layers of radial tension cables comprising a layer of suspension cable, a layer of ridge cable and a layer of valley cable, wherein the suspension cable is located above the ridge cable, the ridge cable is located above the valley cable, one end of each of the suspension, ridge and valley cables is connected to the ring cable, and the other end of each of the suspension, ridge and valley cables is connected to a peripheral supporting structure, a coating membrane is tensioned between the ridge cable and the valley cable that are adjacent to each other and function as a skeleton to tension the coating membrane, wherein based on structural nonlinear characteristics of the pre-stress cable-membrane tensegrity structure of an opening type during the bearing whole-process, sequentially dividing a structural-mechanics-response change process into following stages of:

stage ①, that is, an elastic stage, a load is increased from a structure formation state under a pre-tension stress and a self weight to a normal structure formation state under a permanent load and one times of variable load, the tension stress of the valley cable is gradually decreased, the tension stress on other tension cables is proximately linearly increased, and the ring cable deforms nonlinearly and vertically;

stage ②, the valley cable is loosened or the tension stress thereof is decreased to the minimum, the tension stress of the other cables is proximately linearly increased, and the ring cable nonlinearly vertically deforms with a maximum vertical-deformation incremental times larger than that of a load incremental times;

stage ③, the valley cable is tightened again, the tension stress on all tension cables is proximately linearly increased, and the ring cable nonlinearly vertically deforms with the maximum vertical-deformation incremental times less than that of the load incremental times;

stage ④, the tension stress of the tension cables is nonlinearly increased with a stress incremental times less than the load incremental times until the tension cables are tensioned to be broken, and the ring cable nonlinearly vertically deforms with the maximum vertical-deformation incremental times less than that of the load incremental times until the structure is failed in bearing capacity, wherein the load incremental times is a ratio of the applied load to the one times of variable load; the vertical-deformation incremental times is a ratio of the structure vertical deformation under the permanent load and the applied load to the structure vertical deformation under the permanent load and the one times of variable load; the stress incremental times is a ratio of the tension cable stress under the permanent load and the applied load to the tension cable stress under the permanent load and the one times of variable load; the applied load is a load applied on the structure except for the permanent load; the terms of 'valley is loosened' means that the tension stress of the valley cable is equal to 0.

Alternatively, a structure material model is set to have a nonlinear property during the bearing whole-process analysis of the pre-stress cable-membrane tensegrity structure of an opening type; a Pre-tension stress loss of tension cable and a cable clamp anchor node restriction rigidity are considered in a calculation model based on a test result, and a structural system geometrically nonlinear is also considered during calculating; a large universal finite element program is adopted to analyze and a Newton-Raphson nonlinear iteration strategy is used to solve equations. Advantageously, determining a relation among various parameters, such as bearing capacity, vertical deformation capacity, tension cable stress, etc., in the structural system during the bearing whole-process based on the calculation model and the calculation method.

The multi-stage design method, based on a bearing whole-process, of a pre-stress cable-membrane tensegrity structure comprises step 1: determining following parameters: cable elastic modulus, yield strength, limit strength $6_u$, linear expansion coefficient, cable clamp anchor node friction factor and cable clamp anchor node restriction rigidity; building up a simulation calculation model conforming to a building by means of a computer soft, and inputting the above parameters into the simulation calculation model to perform the bearing whole-process analysis of the pre-stress cable-membrane tensegrity structure of an opening type, wherein the pre-tension stress of tension cable is $6_0$; and determining mechanical response stages of the respective structures; and drawing related structural response curves. Alternatively, the method further comprises step of: checking the cable elastic modulus, the yield strength, the limit strength $6_u$, the linear expansion coefficient, the cable clamp anchor node friction factor and the cable clamp anchor node restriction rigidity by means of mechanics experiment. Preferably, the pre-tension stress of tension cable $6_0$ is in a range of $0.2$-$0.36_u$.

The multi-stage design method, based on a bearing whole-process, of a pre-stress cable-membrane tensegrity structure further comprises step 2: based on the structure response stage ①, that is, the elastic stage, under the action of the permanent load and the one times of variable load, calculating the tension cable stress $6_1$, and determining whether the tension cable stress $6_1$ satisfies a safety condition regarding bearing stress in stage ①: $0 \leq 6_1 \leq (0.35$-$0.5)6_u$; calculating a vertical deformation value $d_1$ of the ring cable and a curve angle $\alpha_1$ of the vertically deforming valley cable, wherein $d_1$ is the vertical deformation value of the ring cable under the action of the permanent load and the one times of variable load ($P_1$), $\alpha_1$ is an angle of a tangent line at any point of the valley cable curve with respect to a horizontal line after the valley cable vertically deforms under the action of the permanent load and the one times of variable load, and determining whether vertical deformation value $d_1$ and the curve angle $\alpha_1$ satisfy a safety condition regarding vertical deformation capacity in stage ①: $d_1 \leq [d_1]$, $\alpha_1 \geq [\alpha]$, in which $[d_1]$ is an allowable maximum vertical deformation value for the ring cable under the action of the permanent load and the one times of variable load according to membrane structure building using requirements, $[\alpha]$ is an allowable minimum curve angle for the valley cable after the valley cable vertically deforms under the action of the permanent load and the one times of variable load, if determining result is yes, it determines that the pre-tension stress of tension cable $6_0$ is suitable, if determining result is not, it needs to adjust the pre-tension stress of tension cable $6_0$, or change the structure system arrangement, or increase tension cable rigidity or bearing capacity, and redesign based on the step 1 and the step 2 until the above conditions are satisfied. Alternatively, $[d_1]$ is set to be equal to $L/(60$-$85)$, in which L is a cantilever length of the pre-stress cable-membrane tensegrity structure of an opening type; $[\alpha]$ is in a range of 5-7 degrees.

The multi-stage design method, based on a bearing whole-process, of a pre-stress cable-membrane tensegrity structure further comprises step 3: based on the structure response stage ② where the valley cable is loosened or the tension stress thereof is decreased to the minimum, determining whether the load incremental times satisfies a safety condition regarding elastic bearing capacity in stage ②: $P_s/P_1 \geq K_s$, wherein $K_s$ is the system elastic bearing capacity coefficient; determining whether an elastic vertical deformation capacity coefficient $d_s/d_1$ satisfies a safety condition regarding elastic vertical deformation capacity in stage ②: $d_s/d_1 \geq \gamma(P_s/P_1)$, wherein y is a coefficient, $d_s$ is a ring cable vertical deformation value under the applied load ($P_s$) when the valley cable is loosened or the tension stress thereof is decreased to the minimum, if the safety condition regarding elastic bearing capacity or the safety condition regarding elastic vertical deformation capacity in the step 3 is not satisfied, it needs to adjust the initial tension force of the tension cable, or increase tension cable rigidity or bearing capacity, and redesign based on the step 1, the step 2 and the step 3 until the safety condition regarding elastic bearing capacity and the safety condition regarding elastic vertical deformation capacity in the step 3 are satisfied. Alternatively, $K_s = 1.3$-$1.8$; $\gamma = 1.0$-$1.2$.

The multi-stage design method, based on a bearing whole-process, of a pre-stress cable-membrane tensegrity structure further comprises step 4: based on the structure response stage ③, determining whether the load incremental times $P_y/P_1$ when the tension cable is yielded satisfies a safety condition regarding system yield bearing capacity in stage ③: $P_y/P_1 \geq K_y$, wherein $K_y$ is the system yield bearing capacity coefficient; calculating the ring cable vertical deformation value $d_y$ and the valley cable vertical deforming curve angle $\alpha_y$ when the tension cable is yielded, and determining whether the deformation value $d_y$ and the curve angle $\alpha_y$ satisfy a safety condition regarding vertical deformation capacity in stage ③: $d_y \leq [d_y]$, $\alpha_y \geq [\alpha_y]$, wherein $[d_y]$ is an allowable maximum vertical deformation value for the ring cable when the tension cable is yielded, $[\alpha_y]$ is an allowable minimum curve angle when the tension cable is yielded after the valley cable deforms, and wherein $[\alpha_y] \geq 0$; if the safety condition regarding system yield bearing capacity or the safety condition regarding vertical deformation capacity in the step 4 is not satisfied, it needs to adjust the initial tension force of the tension cable, or increase tension cable rigidity or bearing capacity, and redesign based on the step 1, the step 2, the step 3 and the step 4 until the safety condition regarding system yield bearing capacity and the safety condition regarding vertical deformation capacity in the step 4 are satisfied. Alternatively, $K_y = 5.0$–$6.5$; $[d_y] = L/(12\text{-}20)$.

The multi-stage design method, based on a bearing whole-process, of a pre-stress cable-membrane tensegrity structure further comprises step 5: based on the structure response stage ④, determining whether the load incremental times $P_u/P_y$ corresponding to tension cable limit breaking satisfies a safety condition regarding system limit bearing capacity in stage ④: $P_u/P_y \geq K_u$, wherein $K_u$ is the system bearing capacity ductility coefficient; calculating the ring cable vertical deformation value $d_u$ corresponding to the tension cable limit breaking, and determining whether the system vertical deformation capacity ductility coefficient $d_u/d_y$ satisfies a safety condition regarding system limit vertical deformation capacity in stage ④: $d_u/d_y \geq \gamma(P_u/P_y)$; if the safety condition regarding system limit bearing capacity or the safety condition regarding system limit vertical deformation capacity in the step 5 is not satisfied, it needs to adjust the initial tension force of the tension cable, or increase tension cable rigidity or bearing capacity, and redesign based on the step 1, the step 2, the step 3, the step 4 and the step 5 until the safety condition regarding system limit bearing capacity and the safety condition regarding system limit vertical deformation capacity in the step 5 are satisfied. Alternatively, $K_u = 1.4$–$1.8$.

The above multi-stage design method, based on bearing whole-process, of a pre-stress tensegrity structure of an opening type can achieve one of the following technical effects:

(1) it completely fits the mechanics response of the pre-stress cable-membrane tensegrity structure of an opening type in the whole-process from loading to failure, fully reveals safety control factors of the structure in various bearing stages, fully reflects the nonlinear flexible structure characteristics of the pre-stress cable-membrane tensegrity structure of an opening type during the bearing whole-process, and solves the technical problems in the existing method of designing a pre-stress tensegrity structure of an opening type.

(2) It performs a multi-stage design control on the pre-stress cable-membrane tensegrity structure of an opening type, and meets the requirements on the structure bearing capacity safety performance and the ductility performance by controlling the bearing capacity safety factors in various stages.

(3) It meets the requirements on the structure vertical deformation capacity safety performance and the ductility performance by analyzing and determining the structure vertical deformation capacity line and the structure vertical deformation ductility capacity line, and taking the structure vertical deformation capacity coefficient and the structure vertical deformation ductility capacity coefficient as the design control targets.

(4) It adopts the multi-stage design-target control based on the bearing whole-process of the structure, thus makes up the deficiency of the existing design method including only the elastic stage design, and better realizes the engineering safety, economy and rationality.

BRIEF DESCRIPTION OF THE DRAWINGS

The above and other features of the present invention will become more apparent by describing in detail exemplary embodiments thereof with reference to the accompanying drawings, in which.

REFERENCE LIST

Suspension cable-1, ridge cable-2, valley cable-3, ring cable-4, coating membrane-5, ring truss or beam-suspension cable anchor node-6, peripheral steel structure (or supporting structure)-7, ring beam-ridge cable anchor node-8, ring beam-valley cable anchor node-9, ring-cable-clamp anchor node connected to the valley and suspension cables-10, ring-cable-clamp anchor node connected to the ridge cable-11, membrane side cable-12.

Figure 11:
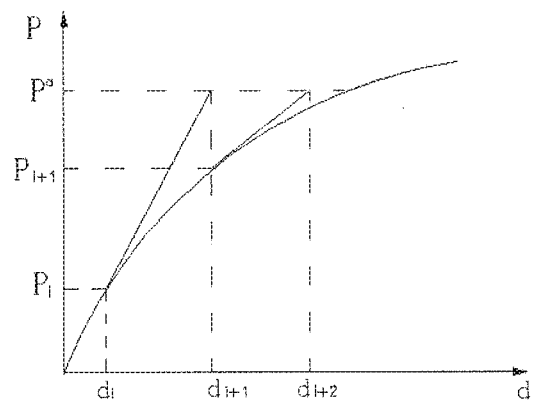
FIG. 11 is an illustrative view of structure bearing whole-process load-mechanical response nonlinear iterative process, according to an exemplary embodiment of the present invention.

In FIG. 11, the horizontal ordinate d indicates the vertical deformation, the vertical ordinate P indicates the restoring force, subscript i indicates the $i^{th}$ step in the iterative process, $P^\alpha$ indicates the target load.

Figure 12:
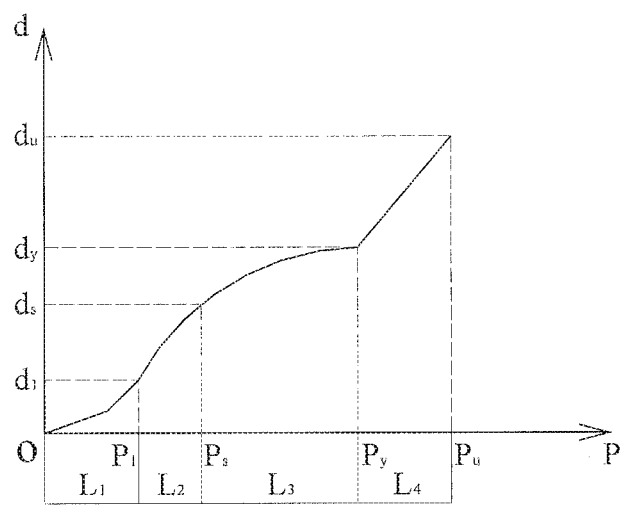
FIG. 12 is a relationship curve between the applied load P and the ring cable vertical deformation d, according to an exemplary embodiment of the present invention.

In FIG. 12, the vertical ordinate d indicates the ring cable vertical deformation, the horizontal ordinate P indicates the applied load, and L indicates different structure response stages in bearing capacity whole-process analysis.

Figure 13:
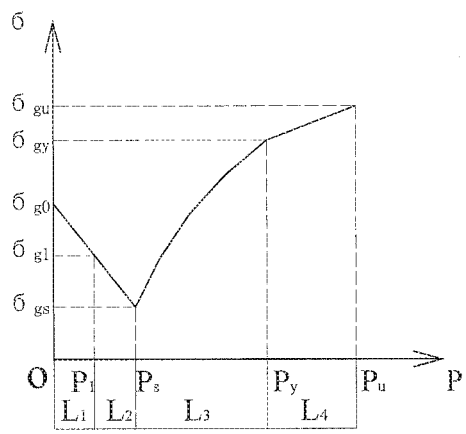
FIG. 13 is a relationship curve between the applied load P and the valley cable stress σ, according to an exemplary embodiment of the present invention.
Figure 14:
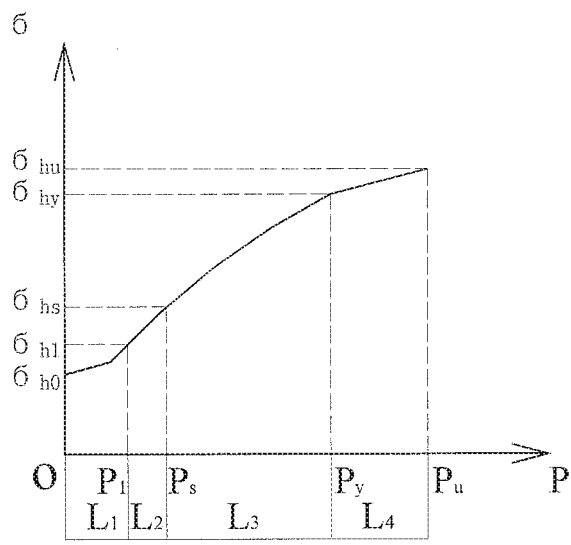
FIG. 14 is a relationship curve between the applied load P and the ring cable stress σ, according to an exemplary embodiment of the present invention.

In FIG. 13, the vertical ordinate $\sigma_g$ indicates the valley cable stress, the horizontal ordinate P indicates the applied load, and L indicates different structure response stages in bearing capacity whole-process analysis.

Figure 15:
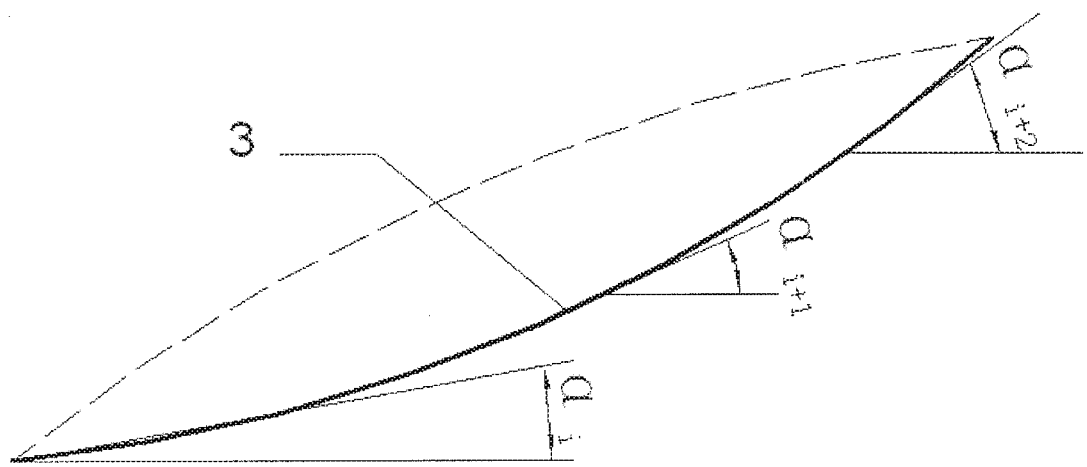
FIG. 15 is an illustrative view of the valley cable vertical deformation according to an exemplary embodiment of the present invention.
Figure 16:
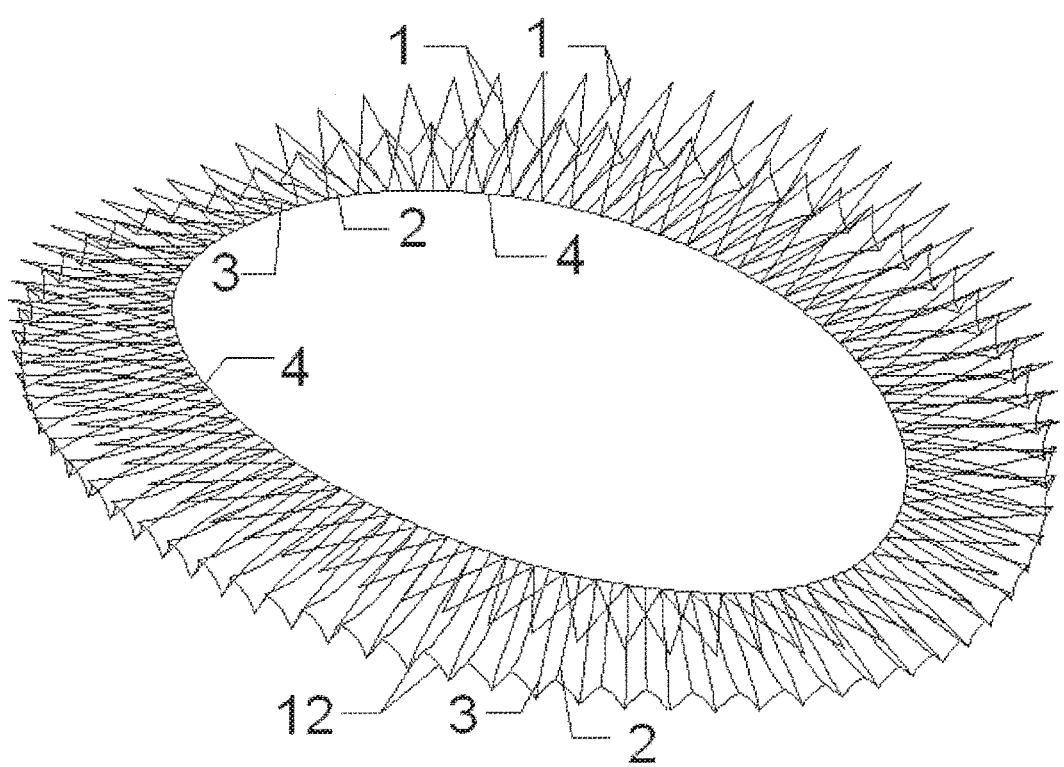
FIG. 16 is an illustrative perspective view of a pre-stress tensegrity structure of an opening type according to an exemplary embodiment of the present invention.
Figure 17:
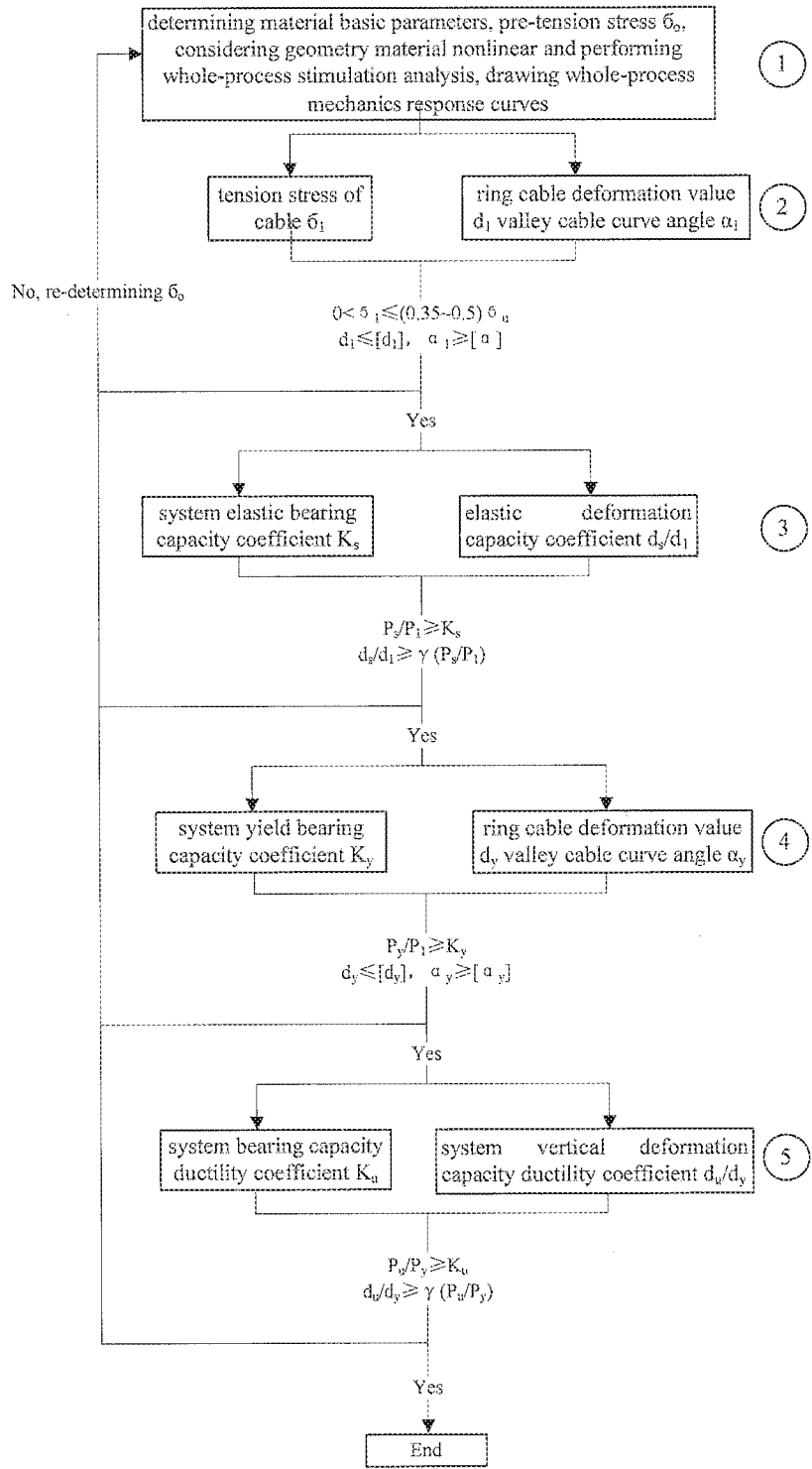
FIG. 17 is a flow chart of multi-stage design method of a bearing whole-process of a pre-stress tensegrity structure of an opening type according to an exemplary embodiment of the present invention.

In FIG. 15, $\alpha_1$ indicates the valley cable curve angle after vertically deforming.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The embodiments described with reference to the drawings are only for demonstration and illustration and rather than for limitation.

Hereafter, it will take a stadium project as an example to describe a cable-membrane tensegrity structure which is asymmetric and is of an opening type with reference to FIGS. 1-9.

Figure 2:
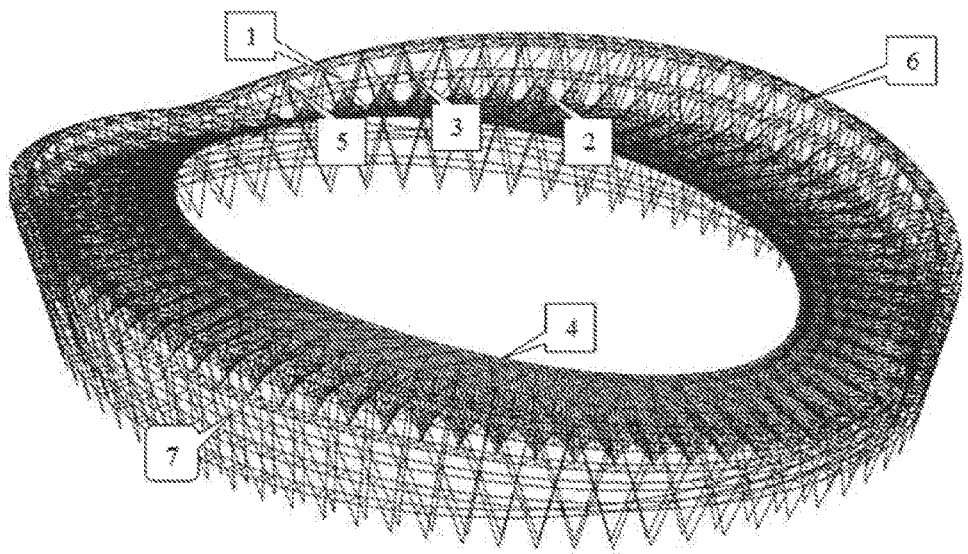
FIG. 2 is a three-dimensional view of a cable-membrane tensegrity structure according to an exemplary embodiment of the present invention.
Figure 3:
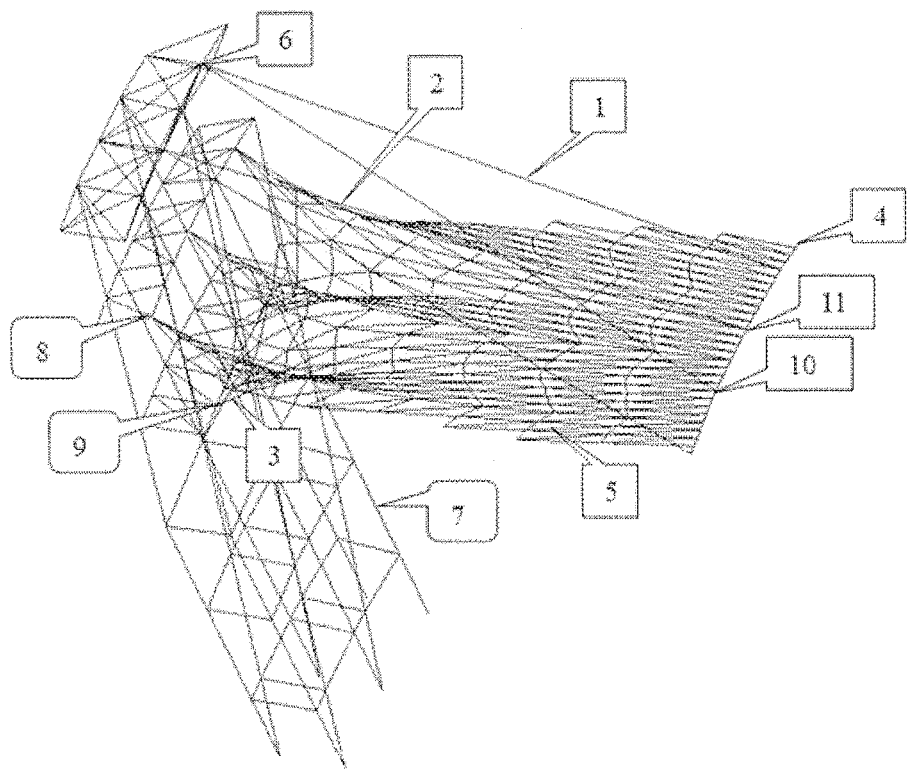
FIG. 3 is a local three-dimensional view of a cable-membrane tensegrity structure according to an exemplary embodiment of the present invention.
Figure 4:
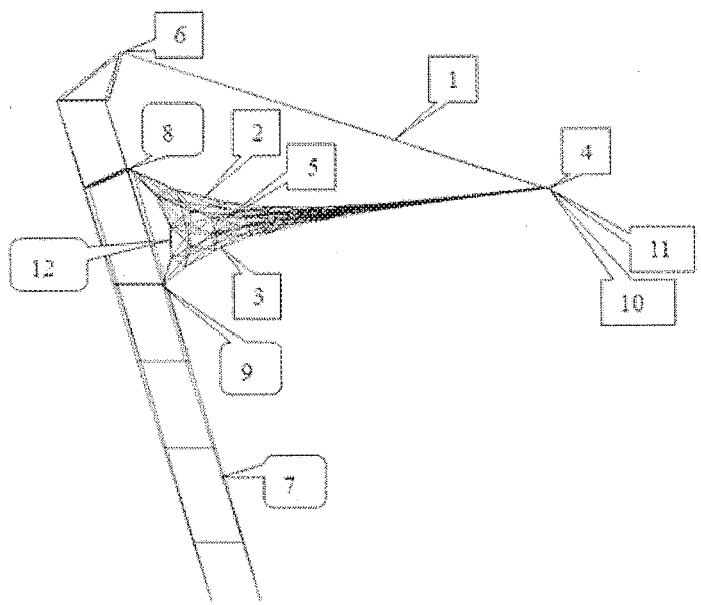
FIG. 4 is a local cross section view of a cable-membrane tensegrity structure according to an exemplary embodiment of the present invention.
Figure 5:
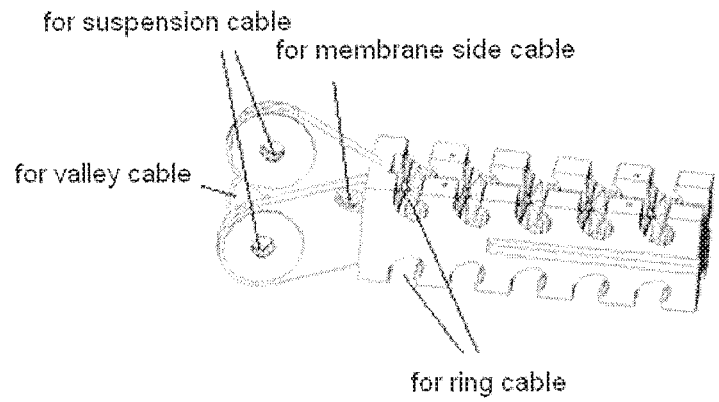
FIG. 5 is an illustrative view of a first ring-cable-clamp anchor node connected to a valley cable and a suspension cable, according to an exemplary embodiment of the present invention.
Figure 6:
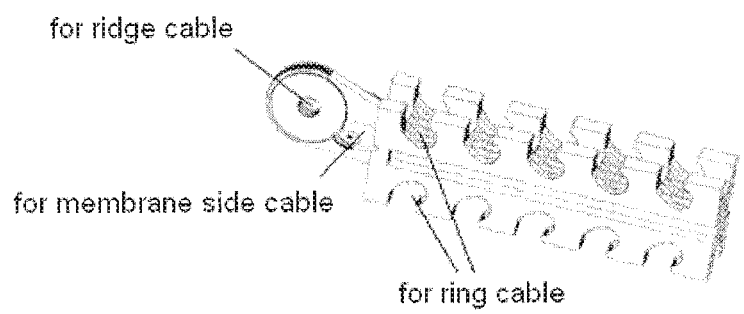
FIG. 6 is an illustrative view of a second ring-cable-clamp anchor node connected to a ridge cable, according to an exemplary embodiment of the present invention.
Figure 7:
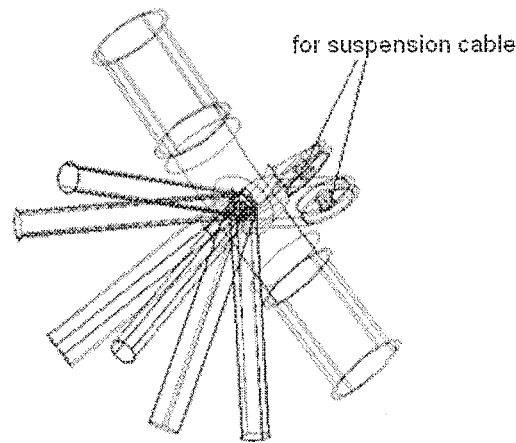
FIG. 7 is an illustrative view of a ring truss or beam-suspension cable anchor node according to an exemplary embodiment of the present invention.
Figure 8:
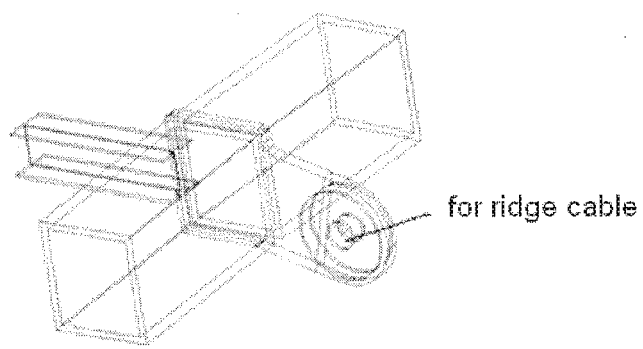
FIG. 8 is an illustrative view of a ring beam-ridge cable anchor node according to an exemplary embodiment of the present invention.
Figure 9:
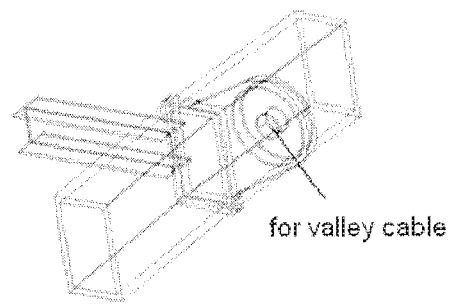
FIG. 9 is an illustrative view of a ring beam-valley cable anchor node according to an exemplary embodiment of the present invention.
Figure 10:
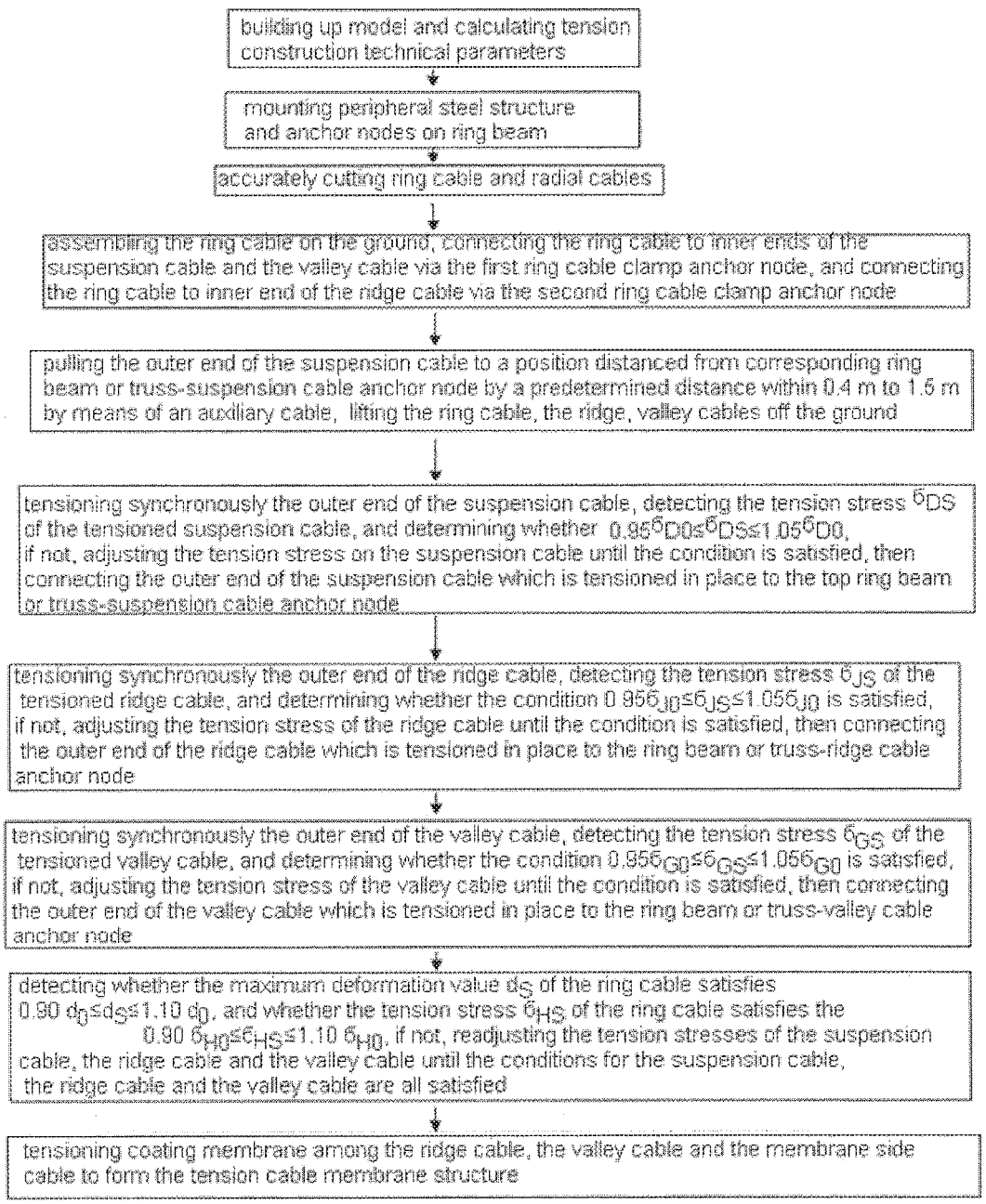
FIG. 10 is a flow chart of a construction method of an asymmetric open cable-membrane tensegrity structure system according to an exemplary embodiment of the present invention.

A peripheral supporting steel structure 7 is firstly built up, as shown in FIG. 2, the peripheral supporting steel structure is configured to be an X-typed post or a ring beam with a ring truss provided on the top thereof.

A ring beam-suspension cable anchor node 6 is provided at the position where the top ring truss is connected to the suspension cable;

A ring beam-ridge cable anchor node in the middle 8 and a ring beam-valley cable anchor node at the bottom 9 are provided at positions where the middle ring beam of the peripheral supporting steel structure 7 are connected to outer ends of the ridge cable 2 and the valley cable 3, respectively;

According to the cable tension, a set of inner ring cables is composed of 10 inner ring cables 4 parallel to each other, the set of inner ring cables are divided into an upper layer and a lower layer, each layer of cables comprises 5 inner ring cables 4;

The inner ring cables 4 are connected to inner ends of the suspension cable 1 and the valley cable 3 by means of the cable clamp anchor node 10;

The inner ring cables 4 are connected to inner end of the ridge cable 2 by means of the cable clamp anchor node 11;

The coating membrane 5 is tensioned among the ridge cables 2 and the valley cables 3 as well as the membrane side cables 11 to form the cable-membrane tensegrity structure which is asymmetric and is of an opening type.

Hereafter, it will describe a method of constructing an cable-membrane tensegrity structure which is asymmetric and is of an opening type with reference to FIGS. 1-10.

Exemplary Embodiment 1:

It will take a stadium project as an example to describe the exemplary embodiment 1.

(1) Performing the whole-process computer simulation analysis of tensioning pre-stressed tension cable, by taking a structure formation meeting design requirement as a target, taking whole tension of cable-membrane structure as a basic principle for tension construction, building up a whole structure calculation model by a computer, and inputting related structure parameters;

using technical parameters, such as, the pre-stress of the tension cables, a cutting length of the cables and a sequence to tension the tension cables, for the tension construction;

wherein the whole-process computer simulation analysis of tensioning pre-stressed tension cable considers structural system geometrical nonlinear, adopts a large universal finite element program and uses a Newton-Raphson nonlinear iteration strategy to solve equations.

(2) Mounting the peripheral steel structure 7 from bottom to top, and mounting the ring beam-valley cable anchor node 9, the ring beam-ridge cable anchor node 8, and the ring beam-suspension cable anchor node 6;

(3) Obtaining cutting lengths of the respective cables based on a result of the construction simulation analysis, and accurately cutting the ring cable 4 and the radial cables 1, 2, 3 based on the obtained cutting lengths;

(4) Assembling the ring cable 4 on the ground, connecting the ring cable 4 to inner ends of the suspension cable 1 and the valley cable 3 via a first ring-cable-clamp anchor node 10, and connecting the ring cable 4 to inner end of the ridge cable 2 via a second ring-cable-clamp anchor node 11;

(5) Pulling the outer end of the suspension cable 1 to a position distanced from a corresponding connection anchor node of the top ring beam or truss and the peripheral steel structure 7, by a predetermined distance within 0.4 m to 1.5 m by means of an auxiliary cable, so as to lift the ring cable 4 together with the ridge cable 2 and the valley cable 3 off the ground;

(6) Replacing a traction assembly with a tension assembly, and synchronously tensioning the outer end of the suspension cable 1 based on the result of the construction stimulation analysis, detecting the tension stress $6_{DS}$ on the tensioned suspension cable 1, and determining whether the tension stress $6_{DS}$ satisfies a suspension-cable-tension-stress determination condition for allowing construction:

$$0.956_{D0} \leq 6_{DS} \leq 1.056_{D0}, \text{ wherein}$$

$6_{D0}$ is a pre-tension stress of suspension cable determined by the whole-process computer simulation analysis, if not, it needs to adjust the tension stress of the suspension cable 1 by loosening or tightening the tensioned suspension cable until the determination condition is satisfied, after the outer end of the suspension cable 1 is tensioned in place, the outer end of the suspension cable 1 is connected to the ring beam or truss-suspension cable anchor node at the top 6.

(7) Pulling the outer end of the ridge cable 2 to a position adjacent to a corresponding ring beam-ridge cable anchor node 8 at the middle layer by means of the auxiliary cable, then replacing a traction assembly with a tension assembly, and synchronously tensioning the outer end of the ridge cable 2 based on the result of the construction stimulation analysis, detecting the tension stress $6_{JS}$ of the tensioned ridge cable 2, and determining whether the tension stress $6_{JS}$ satisfies a ridge-cable-tension-stress determination condition for allowing construction:

$$0.956_{J0} \leq 6_{JS} \leq 1.056_{J0}, \text{ wherein}$$

$6_{J0}$ is a pre-tension stress of ridge cable determined by the whole-process computer simulation analysis, if not, it needs to adjust the tension stress of the ridge cable 2 by loosening or tightening the tensioned ridge cable until the determination condition is satisfied, after the outer end of the ridge cable 2 is tensioned in place, the outer end of the ridge cable 2 is connected to the ring beam or truss-ridge cable anchor node 8.

(8) Synchronously tensioning the outer end of the valley cable 3 based on the result of the construction stimulation analysis, detecting the tension stress $6_{GS}$ of the tensioned valley cable 3, and determining whether the tension stress $6_{GS}$ satisfies a valley-cable-tension-stress determination condition for allowing construction:

$$0.956_{G0} \leq 6_{GS} \leq 1.056_{G0}, \text{ wherein}$$

$6_{G0}$ is a pre-tension stress of valley cable determined by the whole-process computer simulation analysis, if not, it needs to adjust the tension stress of the valley cable 3 by loosening or tightening the tensioned valley cable 3 until the determination condition is satisfied, after the outer end of the valley cable 3 is tensioned in place, the outer end of the valley cable 3 is connected to the ring beam or truss-valley cable anchor node 9.

(9) Detecting the maximum deformation value $d_S$ of the ring cable 4, and determining whether the maximum deformation value $d_S$ satisfies a ring-cable-deformation determination condition for allowing construction:

$$0.90 \, d_0 \leq d_S \leq 1.10 \, d_0, \text{wherein}$$

$d_0$ is a maximum deformation value determined by the whole-process computer simulation analysis;

detecting the tension stress $6_{HS}$ of the ring cable 4, and determining whether the tension stress $6_{HS}$ satisfies a ring-cable-tension-stress determination condition for allowing construction:

$$0.90 \, 6_{H0} \leq 6_{HS} \leq 1.10 \, 6_{H0}, \text{ wherein}$$

$6_{H0}$ is a pre-tension stress of ring cable determined by the whole-process computer simulation analysis, if not, it needs to readjust the tension stress of the suspension cable 1, the ridge cable 2 and the valley cable 3 until the ring-cable-tension-stress and ring-cable-deformation determination conditions for allowing construction, as well as the suspension-cable-tension-stress, ridge-cable-tension-stress and valley-cable-tension-stress determination conditions for allowing construction are satisfied.

(10) Tensioning the coating membrane 5 among the ridge cable 2, the valley cable 3 and a membrane side cable 12 to form the cable-membrane tensegrity structure based on the result of the construction whole-process computer simulation analysis.

Exemplary Embodiment 2:

It will take a stadium project as an example to describe the exemplary embodiment 2.

(1) Performing the whole-process computer simulation analysis of tensioning pre-stressed tension cable, by taking a structure formation meeting design requirement as a target, taking whole tension of cable-membrane structure as a basic principle for tension construction, building up a whole structure calculation model by a computer, and inputting related structure parameters;

using technical parameters, such as, the pre-stress of the tension cables, a cutting length of the cables and a sequence to tension the tension cables, for the tension construction;

wherein the whole-process computer simulation analysis of tensioning pre-stressed tension cable considers structural system geometrical nonlinear, adopts a large universal finite element program and uses a Newton-Raphson nonlinear iteration strategy to solve equations.

(2) Mounting the peripheral steel structure 7 from bottom to top, and mounting the ring beam-valley cable anchor node 9, the ring beam-ridge cable anchor node 8, and the ring beam-suspension cable anchor node 6;

(3) Obtaining cutting lengths of the respective cables based on a result of the construction simulation analysis, and accurately cutting the ring cable 4 and the radial cables 1, 2, 3 based on the obtained cutting lengths;

(4) Assembling the ring cable 4 on the ground, connecting the ring cable 4 to the inner end of the suspension cable 1 via a first ring-cable-clamp anchor node 10, and connecting a second ring-cable-clamp anchor node 11 to the ring cable 4 at the same time;

(5) Pulling the outer end of the suspension cable 1 to a position distanced from a corresponding connection anchor node 6 of the top ring beam or truss and the peripheral steel structure 7, by a predetermined distance within 0.4 m to 1.5 m by means of an auxiliary cable, so as to lift the ring cable 4 off the ground;

(6) Connecting the first ring-cable-clamp anchor node 10 to inner end of the valley cable 3, and connecting the second ring-cable-clamp anchor node 11 to inner end of the ridge cable 2;

(7) Replacing a traction assembly with a tension assembly, and synchronously tensioning the outer end of the suspension cable 1 based on the result of the construction stimulation analysis, detecting the tension stress $6_{DS}$ of the tensioned suspension cable 1, and determining whether the tension stress $6_{DS}$ satisfies a suspension-cable-tension-stress determination condition for allowing construction:

$$0.956_{D0} \leq 6_{DS} \leq 1.056_{D0}, \text{ wherein}$$

$6_{D0}$ is a pre-tension stress of suspension cable determined by the whole-process computer simulation analysis, if not, it needs to adjust the tension stress of the suspension cable 1 by loosening or tightening the tensioned suspension cable until the determination condition is satisfied, after the outer end of the suspension cable 1 is tensioned in place, the outer end of the suspension cable 1 is connected to the ring beam or truss-suspension cable anchor node at the top 6.

(8) Pulling the outer end of the ridge cable 2 to a position adjacent to a corresponding ring beam-ridge cable anchor node 8 at the middle layer by means of the auxiliary cable, then replacing a traction assembly with a tension assembly, and synchronously tensioning the outer end of the ridge cable 2 based on the result of the construction stimulation analysis, detecting the tension stress $6_{JS}$ of the tensioned ridge cable 2, and determining whether the tension stress $6_{JS}$ satisfies a ridge-cable-tension-stress determination condition for allowing construction:

$$0.956_{J0} \leq 6_{JS} \leq 1.056_{J0}, \text{ wherein}$$

$6_{J0}$ is a pre-tension stress of ridge cable determined by the whole-process computer simulation analysis, if not, it needs to adjust the tension stress of the ridge cable 2 by loosening or tightening the tensioned ridge cable until the determination condition is satisfied, after the outer end of the ridge cable 2 is tensioned in place, the outer end of the ridge cable 2 is connected to the ring beam or truss-ridge cable anchor node 8.

(9) Pulling the outer end of the valley cable 3 to be adjacent to a corresponding ring beam or truss-valley anchor node 9 by means of an auxiliary cable, replacing a traction assembly with a tension assembly, and synchronously tensioning the outer end of the valley cable 3 based on the result of the construction stimulation analysis, detecting the tension stress $6_{GS}$ on the tensioned valley cable 3, and determining whether the tension stress $6_{GS}$ satisfies a valley-cable-tension-stress determination condition for allowing construction:

$$0.956_{G0} \le 6_{GS} \le 1.056_{G0}, \text{wherein}$$

$6_{G0}$ is a pre-tension stress of valley cable determined by the whole-process computer simulation analysis, if not, it needs to adjust the tension stress of the valley cable 3 by loosening or tightening the tensioned valley cable 3 until the determination condition is satisfied, after the outer end of the valley cable 3 is tensioned in place, the outer end of the valley cable 3 is connected to the ring beam or truss-valley cable anchor node 9.

(10) Detecting the maximum deformation value $d_S$ of the ring cable 4, and determining whether the maximum deformation value $d_S$ satisfies a ring-cable-deformation determination condition for allowing construction:

$$0.90\ d_0 \le d_S \le 1.10\ d_0, \text{wherein}$$

$d_0$ is a maximum deformation value determined by the whole-process computer simulation analysis;

detecting the tension stress $6_{HS}$ of the ring cable 4, and determining whether the tension stress $6_{HS}$ satisfies a ring-cable-tension-stress determination condition for allowing construction:

$$0.90\ 6_{H0} \le 6_{HS} \le 1.10\ 6_{H0}, \text{wherein}$$

$6_{H0}$ is a pre-tension stress of ring cable determined by the whole-process computer simulation analysis, if not, it needs to readjust the tension stress of the suspension cable 1, the ridge cable 2 and the valley cable 3 until the ring-cable-tension-stress and ring-cable-deformation determination conditions for allowing construction, as well as the suspension-cable-tension-stress, ridge-cable-tension-stress and valley-cable-tension-stress determination conditions for allowing construction are satisfied.

(11) Tensioning the coating membrane 5 between the ridge cable 2, the valley cable 3 and a membrane side cable 12 to form the cable-membrane tensegrity structure based on the result of the construction whole-process computer simulation analysis.

Hereafter, it will describe a multi-stage design method, based on bearing whole-process, of a pre-stress tensegrity structure of an opening type with reference to FIGS. 1-17.

Figure 1:
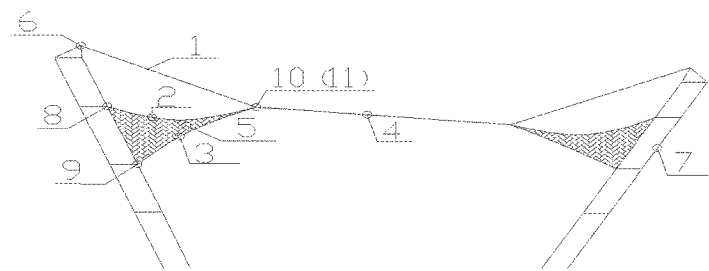
FIG. 1 is a cross section view of a cable-membrane tensegrity structure according to an exemplary embodiment of the present invention.

An opening-type whole tension roof structure, as shown in FIG. 1, has a maximum cantilever length of 43 m and a maximum height of 65 m. The whole roof structure system is formed by a radial suspension cable 1, a membrane structure ridge cable 2 and a valley cable 3, a membrane side cable 12, a ring cable 4 and a peripheral supporting structure 7.

Step 1:

According to the relevant national design standard, determining following parameters: cable elastic modulus $E_s = 1.6 \times 10^5$ MPa, (nominal) yield strength $f_y = 1330$ MPa, limit strength $f_u = 1670$ MPa, linear expansion coefficient $a = 1.2 \times 10^{-5}/°$ C. ; cable clamp anchor node friction factor and cable clamp anchor node restriction rigidity calculated by performing mechanical tests on the cable and the cable clamp anchor node in a laboratory and considering about 3% loss.

Based on the laboratory test results, the structure material model to is set to have the material nonlinear properties, and the structural system geometry nonlinear and the anchor node pre-stress loss are considered in the process of calculation. The analysis of the pre-stress cable-membrane tensegrity structure of an opening type is conducted by the ANSYS soft, and equations are solved by the Newton-Raphson nonlinear iteration strategy. Based on the analysis result, it can be obtained the cable pre-stress $6_0 = 334$ Mpa, determine the mechanics response stages of various structure elements, and draw the response curves of the related structure elements (see FIGS. 12-14).

Step 2:

Under the action of the permanent load and the one times of variable load ($P_1$), through calculation, it can be obtained that the maximum tension stress of tension cable $6_1 = 580$ Mpa $<0.4 \times 1670$ Mpa, the minimum tension stress of tension cable $6_s = 210$ Mpa$>0$, meeting the cable material bearing capability requirement; that the ring cable vertical deformation value $d_1 = 476$ mm$<43000/85$, meeting the requirement of allowable maximum vertical deformation value for the ring cable under the action of the permanent load and the one times of variable load ($P_1$). Also, it can be determined that the valley cable curve angle $\alpha_1 = 6$ degrees$>5$ degrees in a case where the valley cable vertically deforms under the action of snow load, and it can be determined that the valley cable meets the requirement of the allowable minimum curve angle value. Since the above parameters all satisfy the related safety conditions, it is suitable to set the pre-tension stress of tension cable $6_0 = 334$ Mpa, then the next step of design may be conducted.

Step 3:

In the stage ②, through analysis, it can be obtained the load incremental times $P_s/P_1$ equals 1.9 when the valley cable tension stress is decreased to the minimum, wherein $K_s = 1.8$, $P_s/P_1 > K_s$, thus it can be determined that the safety condition regarding elastic bearing capacity in stage ② is satisfied by the load incremental times $P_s/P_1$; through calculation, the ring cable vertical deformation value $d_s$ equals 1163 mm when the tension stress is decreased to the minimum, in addition, the ring cable vertical deformation value $d_1 = 476$ mm under the action of the permanent load and the one times of variable load ($P_1$), thus, it can be obtained that the elastic vertical deformation capacity coefficient $d_s/d_1 = 2.44$. In the step 2, when the parameter $\gamma = 1.2$, $d_s/d_1 > \gamma(P_s/P_1)$ is satisfied. In this case, the safety condition regarding elastic vertical deformation capacity in stage ② is satisfied, then the next step of design may be conducted.

Step 4:

In the preceding stage ③, thought analysis, it can be obtained that the load incremental times $P_y/P_1$ equals 8.2 when the tension cable is yielded, wherein when $K_y = 6.5$, $P_y/P_1 > K_y$, thus, it can be determined that the safety condition regarding system yield bearing capacity in stage ③ is satisfied by the load incremental times $P_y/P_1$; through calculation, it can be obtained that the ring cable vertical deformation value $d_y$ equals 2863 mm when the tension cable is yielded, and when $[d_y] = L/15 = 2867$ mm, $d_y < [d_y]$, and further, $\alpha_y = 1.2$ degrees$>0$. thus, it can be determined that the safety condition regarding system yield vertical deformation capacity in stage is satisfied, then the next step of design may be conducted.

Step 5:

In the stage ④, thought analysis, it can be obtained that the load incremental times $P_u/P_y$ equals 1.85 corresponding to the tension cable limit breaking, wherein when $K_u=1.8$, $P_u/P_y>K_u$, thus, it can be determined that the safety condition regarding system limit bearing capacity in stage ④ is satisfied by the load incremental times $P_u/P_y$; thought calculation, it can be obtained that the ring cable vertical deformation value $d_u$ corresponding to the tension cable limit breaking equals 6568 mm, thus, the system vertical deformation capacity ductility coefficient $d_u/d_y$ equals 2.45, wherein when $\gamma=1.2$, $d_u/d_y \geq \gamma(P_u/P_y)$, then it can be determined that the safety condition regarding system limit vertical deformation capacity in stage ④ is satisfied by the system vertical deformation capacity ductility coefficient $d_u/d_y$.

Since all safety conditions are satisfied in the above steps, the design is completed.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A multi-stage design method, based on a bearing whole-process, of a pre-stress cable-membrane tensegrity structure, the cable-membrane tensegrity structure comprising a central opening and being formed by three layers of radial tension cables and a ring cable, the three layers of radial tension cables comprising a layer of suspension cable, a layer of ridge cable and a layer of valley cable, wherein the suspension cable is located above the ridge cable, the ridge cable is located above the valley cable, inner end of each of the suspension, ridge and valley cables is connected to the ring cable, and the other end of each of the suspension, ridge and valley cables is connected to a peripheral supporting structure, a coating membrane is tensioned between the ridge cable and the valley cable that are adjacent to each other and function as a skeleton to tension the coating membrane;

wherein based on structural nonlinear characteristics of the pre-stress cable-membrane tensegrity structure of an opening type during the bearing whole-process, sequentially dividing a structural-mechanics-response change process into following stages of:

stage ①, that is, an elastic stage, a load is increased from a structure formation state under a pre-tension stress and a self weight to a normal structure formation state under a permanent load and one times of variable load, a tension stress of the valley cable is decreased, a tension stress on suspension and ridge cables is linearly increased, and the ring cable deforms nonlinearly and vertically;

stage ②, the valley cable is loosened or the tension stress of the valley cable is decreased to a minimum, the tension stress of the suspension and ridge cables is linearly increased, and the ring cable nonlinearly vertically deforms with a maximum vertical-deformation incremental times larger than a load incremental times;

stage ③, the valley cable is tightened again, the tension stress on all tension cables is linearly increased, and the ring cable nonlinearly vertically deforms with the maximum vertical-deformation incremental times less than the load incremental times;

stage ④, the tension stress of the tension cables is nonlinearly increased with a stress incremental times less than the load incremental times until the tension cables are tensioned to be broken, and the ring cable nonlinearly vertically deforms with the maximum vertical-deformation incremental times less than the load incremental times until the structure is failed in bearing capacity, wherein the load incremental times is a ratio of an applied load to the one times of variable load ($P_1$);

the vertical-deformation incremental times is a ratio of the ring cable vertical deformation under the permanent load and the applied load to the ring cable vertical deformation under the permanent load and the one times of variable load;

the stress incremental times is a ratio of the tension cable stress under the permanent load and the applied load to the tension cable stress under the permanent load and the one times of variable load;

the applied load is the load applied on the structure except for the permanent load;

the terms of 'valley is loosened' means that the tension stress of the valley cable is equal to 0.

2. The method according to claim 1, wherein:

a structure material model is set to have a nonlinear property during the bearing whole-process of the pre-stress cable-membrane tensegrity structure of an opening type;

a pre-tension stress loss of tension cable and a cable clamp anchor node restriction rigidity are considered in a calculation model based on a test result, and a structural system geometrically nonlinear is also considered during calculating;

a large universal finite element program is adopted to analyze and a Newton-Raphson nonlinear iteration strategy is used to solve equations.

3. The method according to claim 2, wherein determining a relation among various parameters in the structural system during the bearing whole-process is based on the calculation model and a calculation method.

4. The method according to claim 1, comprising step 1:

determining parameters including the following: cable elastic modulus, yield strength, limit strength $6_u$, linear expansion coefficient, cable clamp anchor node friction factor and cable clamp anchor node restriction rigidity;

building up a simulation calculation model conforming to a building by means of a computer soft, and inputting the parameters into the simulation calculation model to perform the bearing whole-process of the pre-stress cable-membrane tensegrity structure of an opening type, wherein a pre-tension stress of tension cable is $6_0$; and determining mechanical response stages of the respective structures, and drawing related structural response curves.

5. The method according to claim 4, further comprising step of:

checking the cable elastic modulus, the yield strength, the limit strength $6_u$, the linear expansion coefficient, the cable clamp anchor node friction factor and the cable clamp anchor node restriction rigidity by means of mechanics experiment.

6. The method according to claim 4, wherein the pre-tension stress of tension cable $6_0$ is in a range of $0.26_u$-$0.36_u$.

7. The method according to claim 4, further comprising step 2:

based on the stage ①, that is, the elastic stage, under an action of the permanent load and the one times of variable load, calculating the tension cable stress $6_1$, and determining whether the tension cable stress $6_1$ satisfies a safety condition regarding bearing stress in stage ①: $0<6_1\leq(0.35-0.5)6_u$;

calculating a vertical deformation value $d_1$ of the ring cable and a curve angle $\alpha_1$ of the vertically deforming valley cable, wherein $d_1$ is the vertical deformation value of the ring cable under the action of the permanent load and the one times of variable load ($P_1$), $\alpha_1$ is an angle of a tangent line at any point of a valley cable curve with respect to a horizontal line after the valley cable vertically deforms under the action of the permanent load and the one times of variable load, and determining whether vertical deformation value $d_1$ and the angle $\alpha_1$ satisfy a safety condition regarding vertical deformation capacity in stage (1): $d_1\leq[d_1]$, $\alpha_1\geq[\alpha]$, in which $[d_1]$ is an allowable maximum vertical deformation value for the ring cable under the action of the permanent load and the one times of variable load according to membrane structure building using requirements, $[\alpha]$ is an allowable minimum curve angle for the valley cable after the valley cable vertically deforms under the action of the permanent load and the one times of variable load, if determining result is yes, then it is determined that the pre-tension stress of tension cable $6_0$ is suitable, if determining result is not, then adjusting the pre-tension stress of tension cable $6_0$, or changing an arrangement of the structure, or increasing tension cable rigidity or bearing capacity, and redesigning based on the step 1 and the step 2 until the safety condition regarding vertical deformation capacity in stage (1) is satisfied.

8. The method according to claim 7, wherein
$[d_1]$ is set to be equal to $L/(60-85)$, wherein L is a cantilever length of the pre-stress cable-membrane tensegrity structure of an opening type;
$[\alpha]$ is in a range of 5-7 degrees.

9. The method according to claim 7, further comprising step 3:
based on the structure response stage ② where the valley cable is loosened or the tension stress thereof is decreased to the minimum, determining whether the load incremental times $P_s/P_1$ satisfies a safety condition regarding elastic bearing capacity in stage ②: $P_s/P_1\geq K_s$, wherein $K_s$ is the system elastic bearing capacity coefficient;
determining whether an elastic vertical deformation capacity coefficient $d_s/d_1$ satisfies a safety condition regarding elastic vertical deformation capacity in stage ②: $d_s/d_1\geq\gamma(P_s/P_1)$, wherein $\gamma$ is a coefficient, $d_s$ is a ring cable vertical deformation value under the applied load ($P_s$) when the valley cable is loosened or the tension stress thereof is decreased to the minimum,
if the safety condition regarding elastic bearing capacity or the safety condition regarding elastic vertical deformation capacity in the step 3 is not satisfied, then adjusting the initial tension force of the tension cable, or increasing tension cable rigidity or bearing capacity, and redesigning based on the step 1, the step 2 and the step 3 until the safety condition regarding elastic bearing capacity and the safety condition regarding elastic vertical deformation capacity in the step 3 are satisfied.

10. The method according to claim 9, wherein $K_s=1.3-1.8$;

$\gamma=1.0-1.2$.

11. The method according to claim 9, further comprising step 4:
based on the structure response stage ③, determining whether the load incremental times $P_y/P_1$ when the tension cable is yielded satisfies a safety condition regarding system yield bearing capacity in stage ③: $P_y/P_1>K_y$, wherein $K_y$ is the system yield bearing capacity coefficient and $P_y$ is the load applied on the structure when the tension cable is yielded;
calculating the ring cable vertical deformation value $d_y$, and the valley cable vertical deforming curve angle $\alpha_y$ when the tension cable is yielded, and determining whether the deformation value $d_y$ and the curve angle $\alpha_y$ satisfy a safety condition regarding vertical deformation capacity in stage ③: $d_y\leq[d_y]$, $\alpha_y\geq[\alpha_y]$, wherein $[d_y]$ is an allowable maximum vertical deformation value for the ring cable when the tension cable is yielded, and $[\alpha_y]$ is an allowable minimum curve angle when the tension cable is yielded after the valley cable deforms, and wherein $[\alpha_y]\geq0$;
if the safety condition regarding system yield bearing capacity or the safety condition regarding vertical deformation capacity in the step 4 is not satisfied, it needs to adjust the initial tension force of the tension cable, or increase tension cable rigidity or bearing capacity, and redesign based on the step 1, the step 2, the step 3 and the step 4 until the safety condition regarding system yield bearing capacity and the safety condition regarding vertical deformation capacity in the step 4 are satisfied.

12. The method according to claim 11, wherein $K_y=5.0-6.5$;

$[d_y]=L/(12-20)$, wherein L is a cantilever length of the pre-stress tensegrity structure of an opening type.

13. The method according to claim 11, further comprising step 5:
based on the structure response stage ④, determining whether the load incremental times $P_u/P_y$ corresponding to tension cable limit breaking satisfies a safety condition regarding system limit bearing capacity in stage ④: $P_u/P_y>K_u$, wherein $K_u$ is system bearing capacity ductility coefficient and $P_u$ is the load applied on the structure when the tension cable is in a condition of limit breaking;
calculating the ring cable vertical deformation value $d_u$ corresponding to the tension cable limit breaking, and determining whether the system vertical deformation capacity ductility coefficient $d_u/d_y$ satisfies a safety condition regarding system limit vertical deformation capacity in stage ④: $d_u/d_y\geq\gamma(P_u/P_y)$, wherein $d_u$ is the ring cable vertical deformation value corresponding to the tension cable limit breaking;
if the safety condition regarding system limit bearing capacity or the safety condition regarding system limit vertical deformation capacity in the step 5 is not satisfied, it needs to adjust the initial tension force of the tension cable, or increase tension cable rigidity or bearing capacity, and redesign based on the step 1, the step 2, the step 3, the step 4 and the step 5 until the safety condition regarding system limit bearing capacity and the safety condition regarding system limit vertical deformation capacity in the step 5 are satisfied.

14. The method according to claim 13, wherein $K_u$=1.4–1.8.

* * * * *